United States Patent [19]

Newell

[11] Patent Number: 4,756,490
[45] Date of Patent: Jul. 12, 1988

[54] WELDABLE BASE PLATE FOR TAPE CARTRIDGES

[76] Inventor: Chester W. Newell, 919 Camellia Way, San Jose, Calif. 95117

[21] Appl. No.: 933,819

[22] Filed: Nov. 24, 1986

Related U.S. Application Data

[62] Division of Ser. No. 815,151, Dec. 31, 1985, Pat. No. 4,624,405.

[51] Int. Cl.⁴ ............................................. G11B 33/12
[52] U.S. Cl. ..................................... 242/199; 228/182
[58] Field of Search ........................ 242/199, 200, 192; 220/73; 228/189, 182

[56] References Cited

U.S. PATENT DOCUMENTS

| | | | |
|---|---|---|---|
| 3,625,455 | 12/1971 | Streets | 242/199 |
| 3,642,228 | 2/1972 | Tollkuhn | 242/199 |
| 4,335,857 | 6/1982 | Pfost et al. | 242/192 |
| 4,457,473 | 7/1984 | Mroz et al. | 242/192 |
| 4,502,648 | 3/1985 | Newell | 242/192 |
| 4,523,727 | 6/1985 | Morioka | 242/192 |
| 4,534,523 | 8/1985 | Zarr | 242/192 |
| 4,607,808 | 8/1986 | Collins | 242/192 |
| 4,624,405 | 11/1986 | Newell | 228/49.1 |

*Primary Examiner*—Nicholas P. Godici
*Assistant Examiner*—Samuel M. Heinrich
*Attorney, Agent, or Firm*—Thomas Schneck

[57] ABSTRACT

A method for fabricating upright pins in a base plate, in a mutually orthogonal relationship with respect to the base plate. A first set of holes is made in a base plate at locations needed within an apparatus such as a tape cartridge. The holes are slightly oversize with respect to pins to be permanently seated therein. A second set of holes, a mirror image of the first set of holes, is made in a pin holder plate, except that the holes are not oversize. The second set of holes is adapted to hold pins in frictional contact therein. Once the pins have been disposed in the second set of holes, the holder plate is made to overlay the base plate with the outwardly facing ends of the pins brought into flush alignment with the back side of the base plate by projection through the base plate, but without the pins touching the base plate. The bottoms of the pins are now welded in place by means of a high pulse-power welding apparatus such as a laser working on the back side of the base plate. A programmed mechanical work holder may move a laser relative to pin locations and melt pins and adjacent rims of holes thereby fusing the two together, permanently attaching the pins to the base plate without distortion of either. The holder plate is then removed.

4 Claims, 1 Drawing Sheet

U.S. Patent  Jul. 12, 1988  4,756,490
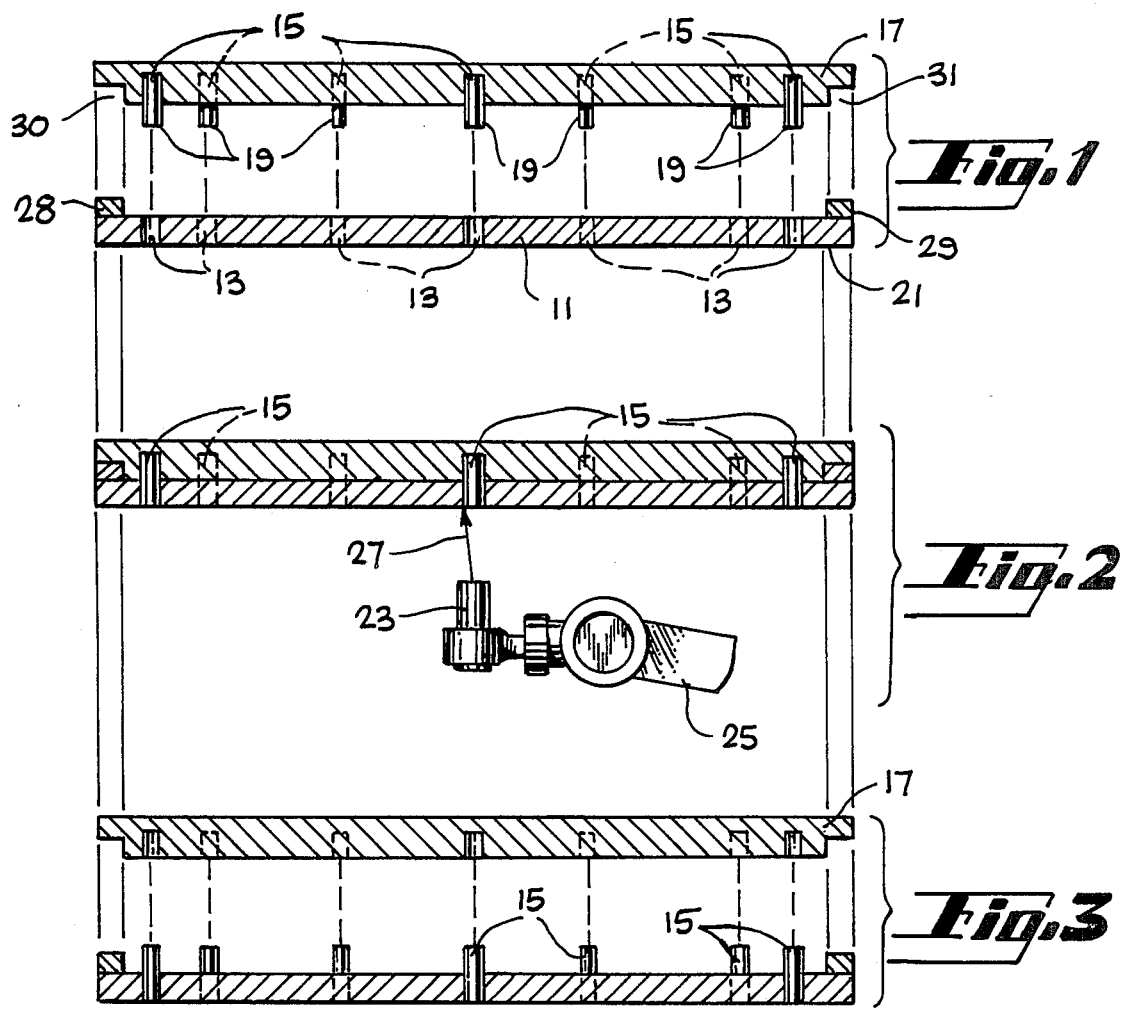
*Fig.1*
*Fig.2*
*Fig.3*
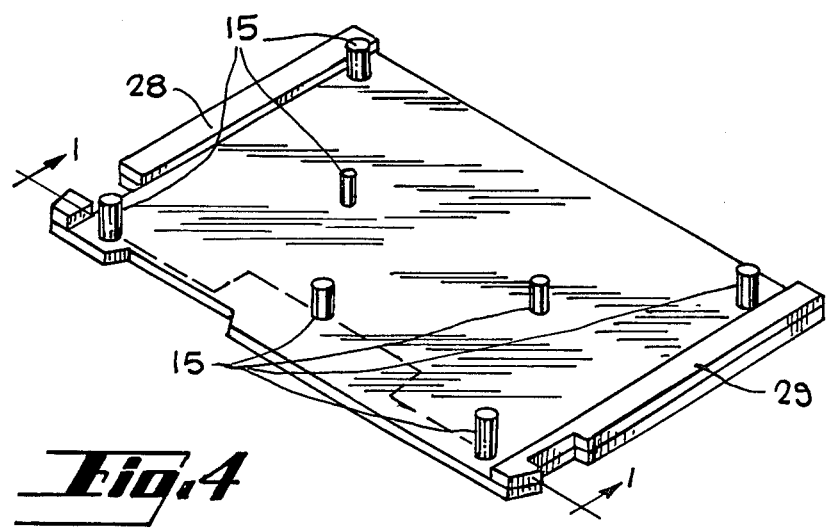
*Fig.4*

WELDABLE BASE PLATE FOR TAPE CARTRIDGES

This is a divisional of co-pending application Ser. No. 815,151 filed on Dec. 31, 1985, now U.S. Pat. No. 4,624,405.

DESCRIPTION

1. Technical Field

The invention relates to fabrication of base plates having upright pins and in particular to such base plates used in defining a tape path, as in a magnetic tape data cartridge.

2. Background Art

In U.S. Pat. No. 4,335,857 to Pfost et al. a tape guiding system is disclosed wherein magnetic tape is trained over a path employing a number of upright pins in a magnetic tape data cartridge having an ANSI standard configuration. In addition to defining the tape path, pins are used as axles for tape hubs and various rollers and capstans employed in the apparatus. All of these pins are mounted in a base plate having a generally planar surface. The pins are mounted orthogonally with respect to the base plate to avoid distortion as the tape passes a magnetic head. If a pin is tilted with respect to vertical, then one portion of the tape has a shorter or longer path than another portion of the tape. This causes the shorter or longer path portion to travel at a respectively slower or faster velocity than the remainder of the tape. These velocity differentials past the tape head cause tape-edge and signal distortions. However, by maintaining proper alignment of the pins, these, as well as other distortions, are minimized.

In the prior art, pins were usually forced into holes and frictionally held therein. If a pin entered a hole crooked, there was a chance of local buckling of the base plate, possibly ruining the plate, or the pin remaining tilted, with the above mentioned result.

An object of the invention was to devise a method of permanently seating pins in a base plate in a manner such that the pins are orthogonal to a planar surface of the plate, without any buckling of the plate.

DISCLOSURE OF THE INVENTION

The above object has been met using a construction employing welding of pins in oversize holes. The pins are held in the oversize holes in a holder plate fixture having a mirror image of holes with respect to a base plate in which the pins are to be mounted. Pins are frictionally held in place in the holder plate in a manner such that the bottoms of the pins will all be flush with the lower surface of the base plate when the holder plate and the base plate are brought together. Once the pins from the holder plate are inserted into the oversize holes of the base plate they are welded in place from the back side of the base plate and then the holder plate is removed. Welding is preferably by an automatically manipulated tool holder, such as a robot arm.

BRIEF DESCRIPTION OF THE DRAWINGS

FIGS. 1-3 are side sectional views of steps for mounting pins in a base plate orthogonal to the plate surface.

FIG. 4 is a perspective view of a base plate showing pins mounted orthogonally with respect to the surface of the plate with the lines 1—1 representing a section through the plate along which FIGS. 1-3 are viewed.

BEST MODE FOR CARRYING OUT THE INVENTION

With reference to FIG. 1, a base plate 11 may be seen having a plurality of holes 13, forming a first set of holes, punched through the base plate in a manner such that the holes are orthogonal to the upper surface of the plate. In a preferred embodiment for a particular ANSI standard magnetic tape data cartridge, the base plate is thin, approximately 0.030 inches, and is of mild steel. Metal plates having a thickness in the range 0.020 to 0.040 inches may be used. This compares in strength to a conventional base plate thickness of 0.100 inches for aluminum. Steel may be used as a substitute for aluminum, a standard material, also to allow room for wider tape, yet remain within the standard ANSI specification for tape cartridge dimensions and weight. Dimensions may be scaled to accommodate other standard cartridge sizes. The advantages of use of oversize tape are explained in U.S. Pat. No. 4,502,648 to C. W. Newell, incorporated by reference herein. The steel should have the same weight as a comparable aluminum base and should be selected to have comparable stiffness, i.e. resistance to flexing. Most mild carbon or stainless steel plate will suffice. Other metals, denser than aluminum could also be used. The areawise shape of the plate, as well as its lateral edge thickness dimensions, conforms at its registration points in a tape cartridge receiving unit to ANSI standards for magnetic tape data cartridges.

One of the advantages of punching oversize holes through the base plate is that it is more economical than drilling for press-fit. However, if a thicker base plate is desired, conventional drilling may also be used. If the punching method is used, all of the first set of holes 13 should be simultaneously punched. The size of each punched hole is slightly oversize, perhaps by 0.001 inches in radius or slightly less, with respect to the radius of a pin to be placed therein. In the prior art, pins were placed in tight frictional contact within a hole. The present invention seeks to avoid such frictional contact so that a pin will easily fit into a respective hole without contacting an upper rim of the hole. Non-uniform rim contact is one of the primary causes of pin tilt and stressing of the base plate.

The pins 15 are seated in a second set of holes 19 in a holder plate 17, top ends first. The second set of holes is a mirror image of the first set of holes and is drilled orthogonal to the planar surface of the holder plate 17. The radial size of the second set of holes is slightly reduced so as to hold the pins 15 in light frictional contact therein. The depth of the second set of holes is such that the pins will be flush with the lower surface 21 of base plate 11 when the two plates are brought into proximity, the holder plate overlaying the base plate, or vice-versa. The height of the pins depends upon their function in a tape cartridge. For example, pins used as an axle for a drive pulley, might be higher than pins used to guide or turn tape in the situation where the height of the tape is below the height of the drive pulley. The greater height of the longer pins is accommodated by placing the pins more deeply into holder plate 17. This requires that the holder plate be substantially thicker than base plate 11 and thicker than the length of the longest pin.

The holder plate 17 is supported above base plate 11 by means of a fixture capable of parallel, overlaid, alignment of the opposed planar surfaces of the two plates. A mechanism, such as a die set, allows the plates to be brought into close proximity or contact with each other, as shown in FIG. 2. Since the second set of holes in the holder plate 17 is a mirror image of the first set of holes in base plate 11, the pins 15 will fit into the oversize first set of holes 13. By bringing the two plates into close proximity or contact, the pins 15 should be seated in base plate 11 such that the bottom of each pin is flush with the back side surface 21 of base plate 11, but the pins themselves do not touch the base plate.

Once the pins are seated in place, they are welded from the back side of plate 11 by means of a fine, high pulse-powered welding device, such as laser 23. The laser is shown to be held in a movable fixture, such as robot arm 25 whereby the laser can be automatically moved to each pin location. Many robots have a teach mode of operation whereby a laser is manually moved or programmed to move to each pin location so that locations may be remembered by the robot. Then, in a playback mode, the robot arm automatically moves to each pin location, operating the laser for a desired time at each point. The laser beam 27 is finely focused at the periphery of the pin and has a sufficient energy for causing a localized melting of the pin and base plate around the rim of the pin. In a preferred embodiment, three spot welds of approximately 0.025 inches in diameter are located equidistantly around the rim of each pin, centering on the crack between pin and hole. The beam energy is sufficient for causing localized melting through at least 50% of the base plate thickness at the periphery of the pin, but not all the way through the plate, an order to firmly secure the pin in place. The pin and the base plate material should have similar melting characteristics, i.e. should melt at about the same temperature, so that a fusing of the base plate and pin material occurs, thereby forming a good weld.

Rather than moving the laser, the laser may be held stationary and the base plate moved in a similar manner bringing each pin location over the laser. Alternatively, both the laser and the pins may be moved to bring the pins and laser into desired welding positions.

In FIG. 3, the welded pins 15 are shown to be welded in place within base plate 11. Holder plate 17 is now withdrawn, leaving base plate 11 with pins 15 orthogonal to the upper surface of the base plate.

FIG. 4 shows a completed base plate 11 with the upright pins 15 in their desired positions for supporting tape hubs, rollers, belts and acting as tape guides or turning posts.

FIGS. 1 and 4 show the addition of parallel strips 28, 29 which are spot welded or adhered by other means to the edges of base plate 21 in order to thicken the opposed lateral edges to conform to ANSI reference standards. Holder plate 17 is recessed at points 30, 31 to clear such strips. In other words, the strips 28, 29 bring the plate to ANSI standard dimensions at edge positions where a sensing or a cartridge registration apparatus, as in a cartridge receiving unit in a tape drive, would be built to receive a standard dimension, usually found in an aluminum plate. Thus, if the base plate were 0.030 inches thick, the strips would be 0.070 inches thick to mimic the registration characteristics of an aluminum plate having a standard thickness of 0.100 inches.

While this invention has been described with respect to tape cartridges, it is applicable to the placement of pins and other upright members relative to other surfaces. While laser welding has been described as the preferred method of securing the pins in place, conventional brazing or welding could also be used.

It should also be understood that wherever the term "pin" is used or shown herein, a more complex cylindrical form such as a flanged tape guide may be substituted as required by the system. Where flanged pins are used, the elevation of the flanges is further referenced to the base plate by the holder plate, in suitable fashion.

I claim:

1. A base for standard magnetic tape data cartridges comprising,
   a metal plate having opposed planar surfaces and area dimensions conforming to standard dimensions for magnetic tape data cartridges, the plate being denser and substantially thinner than an aluminum base plate of similar form and function, yet having the same or greater stiffness,
   a plurality of upright metal pins secured to the metal plate, said pins placed at locations for mounting tape hubs, rollers and forming a tape path, and
   a pair of parallel strips of material adhered to opposed lateral edges of the metal plate, adding thickness to the plate at registration locations in a cartridge receiving unit to the extent that the metal plate mimics the thickness of an aluminum base plate at the registration locations.

2. The base of claim 1 wherein said metal plate is a mild steel plate having a thickness in the range of 0.020 to 0.040 inches.

3. A base for standard magnetic tape data cartridges of the type having an aluminum base plate comprising,
   a base plate thinner and denser than an aluminum plate of similar form and function, but having at least the same stiffness, and made of a weldable metal,
   a plurality of upright metal pins attached to the based plate, said pins placed at locations for mounting tape hubs, rollers and forming a tape path, and
   a pair of parallel strips of material adhered to opposed lateral edges of the base plate, adding thickness to the base plate at registration locations in a cartridge receiving unit to the extent that the base plate mimics the thickness of an aluminum base plate at the registration locations.

4. The base of claim 3 wherein said metal plate is a mild steel plate having a thickness in the range of 0.020 to 0.040 inches.

* * * * *